(12) United States Patent
Park

(10) Patent No.: US 9,444,729 B2
(45) Date of Patent: Sep. 13, 2016

(54) FAST APPLICATION RECOGNITION SYSTEM AND FAST APPLICATION PROCESSING METHOD

(71) Applicant: Cheol Jeong Park, Gyeonggi-do (KR)

(72) Inventor: Cheol Jeong Park, Gyeonggi-do (KR)

(73) Assignee: WINS CO., LTD, Gyeonggi-Do (KR)

( * ) Notice: Subject to any disclaimer, the term of this patent is extended or adjusted under 35 U.S.C. 154(b) by 183 days.

(21) Appl. No.: 14/260,242

(22) Filed: Apr. 23, 2014

(65) Prior Publication Data

US 2014/0321468 A1 Oct. 30, 2014

(30) Foreign Application Priority Data

Apr. 24, 2013 (KR) ........................ 10-2013-0045537

(51) Int. Cl.
*H04L 12/725* (2013.01)
*H04L 12/747* (2013.01)
*H04L 12/743* (2013.01)
*H04L 12/947* (2013.01)
*H04L 12/741* (2013.01)

(52) U.S. Cl.
CPC .......... *H04L 45/306* (2013.01); *H04L 45/745* (2013.01); *H04L 45/7453* (2013.01); *H04L 49/251* (2013.01)

(58) Field of Classification Search
None
See application file for complete search history.

(56) References Cited

U.S. PATENT DOCUMENTS

| 2002/0085560 A1* | 7/2002 | Cathey et al. ............... 370/392 |
| 2003/0023710 A1* | 1/2003 | Corlett et al. ............... 709/223 |
| 2003/0065812 A1* | 4/2003 | Beier et al. .................. 709/236 |
| 2013/0128885 A1* | 5/2013 | Kardashov et al. .......... 370/389 |

OTHER PUBLICATIONS

Mary L. Bailey, Burra Gopal Michael, A. Pagels Larry and L. Peterson, Pathfinder: A Pattern-based Packet Classifier, Proceedings of the First Symposium on Operating Systems Design and Implementation, 1994, pp. 1-9.*

* cited by examiner

*Primary Examiner* — Christopher Crutchfield
(74) *Attorney, Agent, or Firm* — The PL Law Group, PLLC

(57) ABSTRACT

A fast application recognition system includes an output management unit to buffer an input packet and transmit the packet to an outside according to control information, a preprocessing path selection unit to receive the packet from the output management unit, extract control information corresponding to a packet's header information, and return the extracted control information to the output management unit, a primary processing unit to receive a packet not processed at the preprocessing path selection unit, extract control information corresponding to a packet's pattern using a primary pattern database, and return the extracted control information to the output management unit, and a statistics control unit to receive a packet from the output management unit according to the control information and the primary processing unit, extract control information corresponding to a packet's pattern using a secondary pattern database, and return the extracted control information to the output management unit.

2 Claims, 6 Drawing Sheets

FAST APPLICATION RECOGNITION SYSTEM AND FAST APPLICATION PROCESSING METHOD

CROSS-REFERENCE TO RELATED APPLICATION AND CLAIM OF PRIORITY

This application claims the benefit of Korean Patent Application No. 10-2013-0045537, filed Apr. 24, 2013, at the Korean Intellectual Property Office, the disclosures of which are incorporated herein in their entirety by reference.

BACKGROUND

1. Field of the Invention

The present invention relates, in general, to a fast application recognition system and a fast application processing method and, more particularly, to a fast application recognition system and a fast application processing method that update a caching table with application analysis information in real time, recognize an application only through a search for the header information of a packet, and conduct a corresponding control policy.

2. Background of the Invention

Conventional network security equipment monitors and controls security risks using Internet Protocol (IP) and Transmission Control Protocol (TCP) headers. However, with the development of tunneling or proxy technology and the integration of applications into the web, it has become difficult to determine the security risk of an actual network using only the IP/TCP header information of a simple packet. In order to resolve this problem, next-generation security equipment is equipped with Deep Packet Inspection (DPI), which is a technology for recognizing not only IP/TCP header information but also an application present in a data header and performing control in accordance with a policy defined in the corresponding application, thereby enhancing the security of a network. Furthermore, DPI has been popularly used in the traffic management field, and has been chiefly used as a technology for generally improving network visibility. In particular, recently, DPI has gradually developed to a service/system/device control technology and a billing technology. However, DPI is disadvantageous in that it is not applied to network security equipment that should inspect all of a large number of packets in spite of the above-described various advantages because it requires many system resources for session/application-level analysis/control rather than packet-level detection/control.

SUMMARY

Accordingly, the present invention has been made keeping in mind the above problems occurring in the prior art, and an object of the present invention is to provide a fast application recognition system and a fast application processing method that, in order to minimize the consumption of system resources during application recognition-based packet control, recognizes an application only through a search for the header information of a packet, outputs control information in accordance with a corresponding control policy, and sends only statistics information to a host, thereby minimizing the load of the host and also processing the application recognition control of all packets at fast speed.

In accordance with an aspect of the present invention, there is provided a fast application recognition system, including an output management unit configured to buffer an input packet, and transmit the packet to an outside in accordance with control information; a preprocessing path selection unit configured to receive the packet from the output management unit, extract control information corresponding to header information of the packet, and return the extracted control information to the output management unit; a primary processing unit configured to receive a packet not processed at the preprocessing path selection unit, extract control information corresponding to a pattern of the packet using a primary pattern database, and return the extracted control information to the output management unit; and a statistics control unit configured to receive a packet from the output management unit in accordance with the control information of the preprocessing path selection unit and the primary processing unit, extract control information corresponding to a pattern of the packet using a secondary pattern database, and return the extracted control information to the output management unit.

In accordance with another aspect of the present invention, there is provided a fast application processing method, including an output management step of buffering an input packet, and transmitting the packet to an outside in accordance with control information; a preprocessing path selection step of extracting control information corresponding to header information of the packet received from the output management step, and returning the extracted control information; a primary processing step of receiving a packet not processed at the preprocessing path selection step, extracting control information corresponding to a pattern of the packet using a primary pattern database, and returning the extracted control information; and a statistics control step of receiving a packet from the output management step in accordance with the control information of the preprocessing path selection step and the primary processing step, extracting control information corresponding to a pattern of the packet using a secondary pattern database, and returning the extracted control information.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

Figure 1:
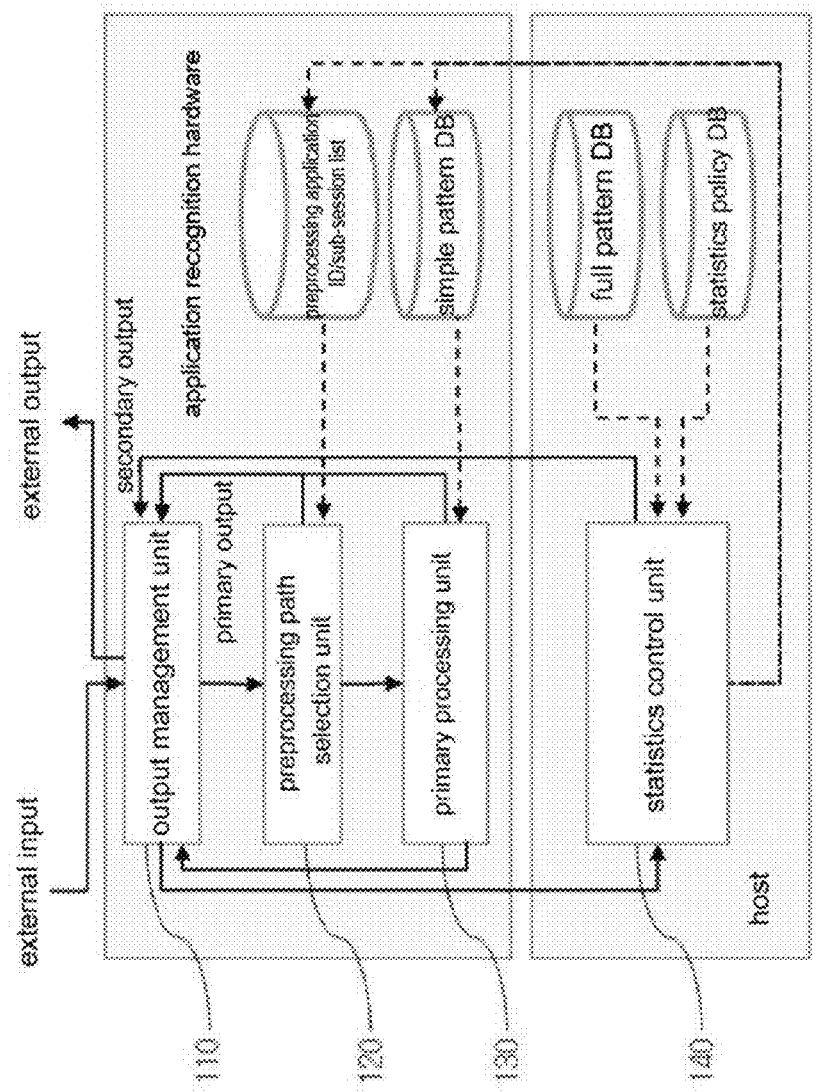
FIG. 1 is a diagram schematically illustrating configuration of a fast application recognition system according to an embodiment of the present invention.

Hereinafter, embodiments of the present invention will be described in detail with reference to the accompanying drawings. Reference now should be made to the elements of drawings, in which the same reference numerals are used throughout the different drawings to designate the same elements. In the following description, detailed descriptions of known elements or functions that may unnecessarily make the gist of the present invention obscure will be omitted.

FIG. 1 is a diagram schematically illustrating configuration of a fast application recognition system according to an embodiment of the present invention. Referring to FIG. 1, the fast application recognition system according to this embodiment of the present invention may include an output management unit 110, a preprocessing path selection unit 120, a primary processing unit 130, and a statistics control unit 140. Each unit may be implemented as a software module or hardware module.

The output management unit 110 may function to buffer a packet input from the outside and output the packet to the outside in accordance with control information. In this case, packet information may be transmitted to the preprocessing path selection unit 120 first, and the preprocessing path selection unit 120 may extract control information corresponding to the packet information input through staged processing modules and return the control information to the output management unit 110. A packet that has not been processed by the preprocessing path selection unit 120 may be processed by the primary processing unit 130 using a simple pattern database. In this case, control information corresponding to packet information may be extracted, and may be transmitted to the output management unit 110.

When one or more packets that have not been processed by the preprocessing path selection unit 120 and the primary processing unit 130 and control information returned by the preprocessing path selection unit 120 or primary processing unit 130 are processed again in an upper stage, the output management unit 110 may transmit a corresponding packet to the statistics control unit 140, and the statistics control unit 140 may processes the packet using a full pattern database and return control information, that is, the results of the processing, to the output management unit 110.

The output management unit 110, the preprocessing path selection unit 120 and the primary processing unit 130 may be implemented using application recognition hardware and the statistics control unit 140 may be implemented using a host. In this case, an advantage arises in that the load of the host can be minimized. However, since the hardware configuration may vary depending on the user environment, the hardware configuration is not limited thereto.

Figure 2:
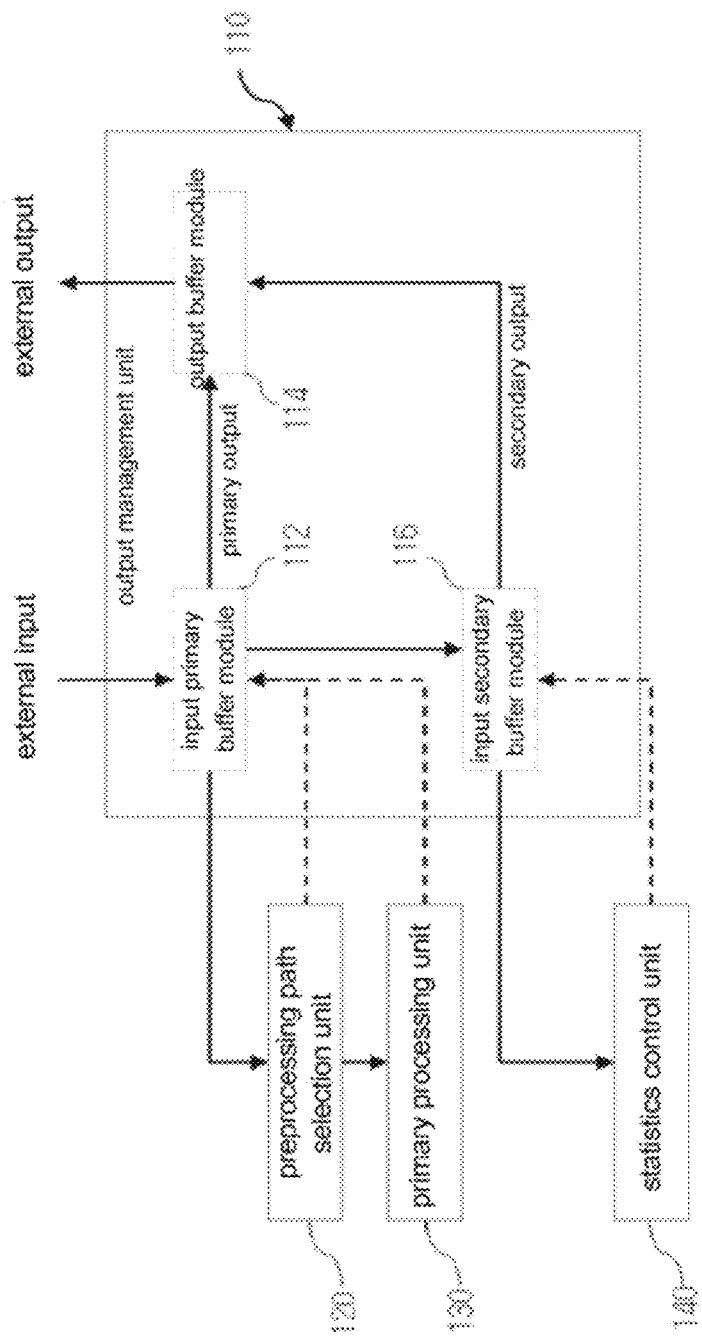
FIG. 2 is a diagram schematically illustrating the configuration of the output management unit of the fast application recognition system according to an embodiment of the present invention.

FIG. 2 is a diagram schematically illustrating the configuration of the output management unit 110a of the fast application recognition system according to an embodiment of the present invention. Referring to FIG. 2, a packet input from the outside may be stored in an input primary buffer module 112. The input primary buffer module 112 may function to transmit the stored packet to a preprocessing path selection unit 120 and move the stored packet to an output buffer module 114 or an input secondary buffer module 116 in accordance with the returned control information. For example, the preprocessing path selection unit 120 may return control information, such as "block," "output," "higher-stage processing," or "no match." The output management unit 110 may not move a packet from the input primary buffer module 112 to the output buffer module 114 and also block the packet if the control information returned from the preprocessing path selection unit 120 is "block," and may move the packet to the output buffer module 114 if the control information is "output." The output management unit 110 may move the packet to the input secondary buffer module 116 if the returned control information is "higher-stage processing," and may output or block the packet in accordance with the control information of the primary processing unit 130 if the returned control information is "no match." The types of control information are not limited thereto.

The packet stored in the input secondary buffer module 116 may be transmitted to the statistics control unit 140. The output management unit 110 may function to transmit the packet stored in the input secondary buffer module 116 to the output buffer module 114 or block the packet in accordance with the control information returned from the statistics control unit 140.

The output buffer module 114 may function to periodically output the stored packet to the outside.

Figure 3:
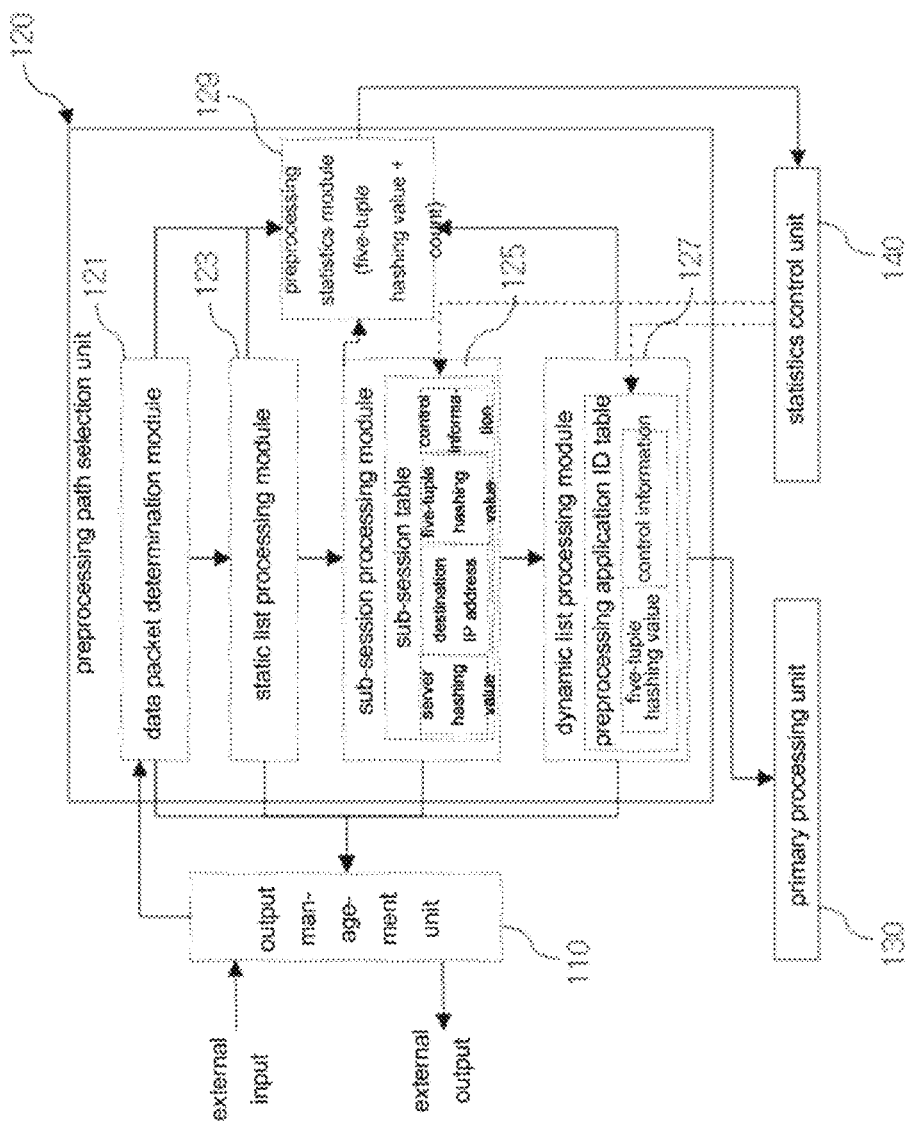
FIG. 3 is a diagram schematically illustrating the configuration of the preprocessing path selection unit of the fast application recognition system according to an embodiment of the present invention.

FIG. 3 is a diagram schematically illustrating the configuration of the preprocessing path selection unit 120 of the fast application recognition system according to an embodiment of the present invention. Referring to FIG. 3, the preprocessing path selection unit 120 may include a data packet determination module 121, a static list processing module 123, a sub-session processing module 125, a dynamic list processing module 127, and a preprocessing statistics module 129. The preprocessing path selection unit 120 sequentially performs the step of primarily determining whether a packet input through the modules is a data packet requiring control, the step of comparing the packet with a static list, and the step of recognizing the packet using an application caching table (a sub-session table, and a preprocessing application ID table), thereby performing packet recognition and control.

The data packet determination module 121 may function to determine the packet input from the output management unit 120, and to transmit the control information "output" to the output management unit 110 in a specific case and transmit the packet to the static list processing module 123 in other cases.

The case where the data packet determination module 121 transmits the control information "output" to the output management unit 110 may correspond to the case where a corresponding packet is a control packet having a data header length of "0," or the case where a corresponding packet is a packet in which an engine is interested in connection with whether the packet is an application, for example, an L2/L3 control packet, or a control packet operative to establish a session, but is not limited thereto.

The data packet determination module 121 may include the function of transmitting the statistics information of a packet to the preprocessing statistics module 129 when transmitting the control information "output" to the output management unit 110. The statistics information of the processed packet is transmitted to the preprocessing statistics module 129, and additional processing is prevented from being performed in a stage higher than the statistics control unit 140, thereby minimizing a higher stage processing load. In this case, the statistics information of a packet may include information about a five-tuple hashing value, packet size, data size, an inter-packet time interval, transmission sequence, etc, but is not limited thereto. The term "five-tuple" refers to packet information including a source IP address, a destination IP address, a source port, a destination port, and protocol information.

The static list processing module 123 functions to compare a packet received from the data packet determination module 121 with a list set by an operator, and to transmit the control information "output" or "block" to the output management unit 110 if the corresponding packet is present in the list and transmit the packet to the sub-session processing module 125 if the corresponding packet is not present in the list.

The operator of this system may make a list of packets whose output is allowed and a list of packets whose output is not allowed in advance. For example, these lists may include a white list WL, that is, a list of packets whose output is allowed, and a black list BL, that is, a list of packets which are dropped. In this case, the static list processing module 123 may function to transmit the control information "output" to the output management unit 110 if a packet received from the data packet determination module 121 is included in the white list WL, and to drop the corresponding packet by transmitting the control information "block" to the output management unit 110 if the corresponding packet is included in the black list BL. In this case, any one or more of the five-tuple values of each packet may be included in the list, but the present embodiment is not limited thereto.

The sub-session processing module 125 may function to receive a packet that is not processed by the static list processing module 123 because it is not included in the list, to generate the server hashing value of the corresponding packet, and to transmit matching corresponding control information to the output management unit 110 if the corresponding control information is present and transfer the packet to the dynamic list processing module 127 if matching control information is not present.

The server hashing value may include the source IP address and destination port information of the packet. A number of advertisement and popup-related sessions that are transmitted upon web access are characterized in that a source IP address and a destination port are the same and do not frequently change. Accordingly, when a sub-session table is searched using a server hashing value, which is the source IP address of a transmitted packet and the hashing value of a destination port, the load of the preprocessing path selection unit 120 may be minimized.

To search for control information matching a server hashing value, a sub-session table including server hashing values and control information may be used. The sub-session table may include server hashing values, destination IP addresses, five-tuple hashing values, and control information, but is not limited thereto. In this case, to search for control information matching a server hashing value, it is searched whether a sub-session table having an entry matching the server hashing value of an input packet is present, and simultaneously it is determined whether a destination IP address has the same value. Only when the server hashing value and the destination IP address are the same may control information defined in a five-tuple hashing value be transmitted to the output management unit 110. Since various methods may be used to search for control information matching a server hashing value, a method of searching for control information is not limited to the above order and method.

Furthermore, the sub-session table may be synchronized by updating sub-session information added/deleted by the statistics control unit 140 in real time. For example, when there is no update within 24 hours, accuracy can be increased by eliminating a corresponding sub-session from the sub-session table, but the present embodiment is not limited thereto.

The sub-session processing module 125 may further function to transmit the statistics information of a packet to the preprocessing statistics module 129 when transmitting the control information of the packet to the output management unit 110.

The dynamic list processing module 127 may function to receive a packet that has not been processed by the sub-session processing module 125 from the sub-session processing module 125 and to transmit control information matching the corresponding packet to the output management unit 110.

To search for control information matching a packet, a preprocessing application ID table may be used. In this case, the preprocessing application ID table may include a five-tuple hashing value, and control information.

To determine whether a transmitted packet is the same as a session whose application ID has been determined and whose control information is present, the dynamic list processing module 127 calculates the five-tuple value of a transmitted packet and searches for a corresponding preprocessing application ID table. The dynamic list processing module 127 may perform a control function in such a way as to, if a corresponding preprocessing application ID table is present, inherit control information defined in a found five-tuple without performing application ID analysis and return the control information to the output management unit 110 and to, if a preprocessing application ID table is not present, transmit a packet to the primary processing unit 130 to search for an application ID. The term "application ID" refers to the unique identification number of each application. Each packet may have an application ID corresponding to pattern information. In this case, an application ID may be represented in the form of "group name+number," for example, "mail1," "mail2," "game101," or "messenger17," but is not limited thereto.

The preprocessing application ID table may be synchronized in real time in such a manner that the statistics control unit 140 updates a corresponding five-tuple hashing value and control information when a preprocessing application ID is updated.

The control information of the preprocessing application ID table may include three types of information, that is, "output," "block," and "higher-stage processing." The control information is control information that is output when there is an analyzed application ID for an input packet. When the control information is "output" or "block," the preprocessing path selection unit 120 performs the control of a packet. If the control information is "higher-stage processing," the preprocessing path selection unit 120 transmits a packet to the statistics control unit 140 corresponding to a higher stage in order to perform another function.

If a preprocessing application ID table matching a received packet is not present, the dynamic list processing module 127 may transmit the control information "no match" to the output management unit 110.

The dynamic list processing module 127 may further include the function of transmitting the statistics information of a packet to the preprocessing statistics module 129 when transmitting the control information of the packet to the output management unit 110. In this case, the statistics information may include a five-tuple hashing value.

The preprocessing statistics module 129 may function to transfer the statistics information of a packet received from each of the modules 121, 123, 125 and 127 of the preprocessing path selection unit 120 to the statistics control unit 140 on a five-tuple hashing value basis, thereby updating the statistics database of the statistics control unit 140.

Figure 4:
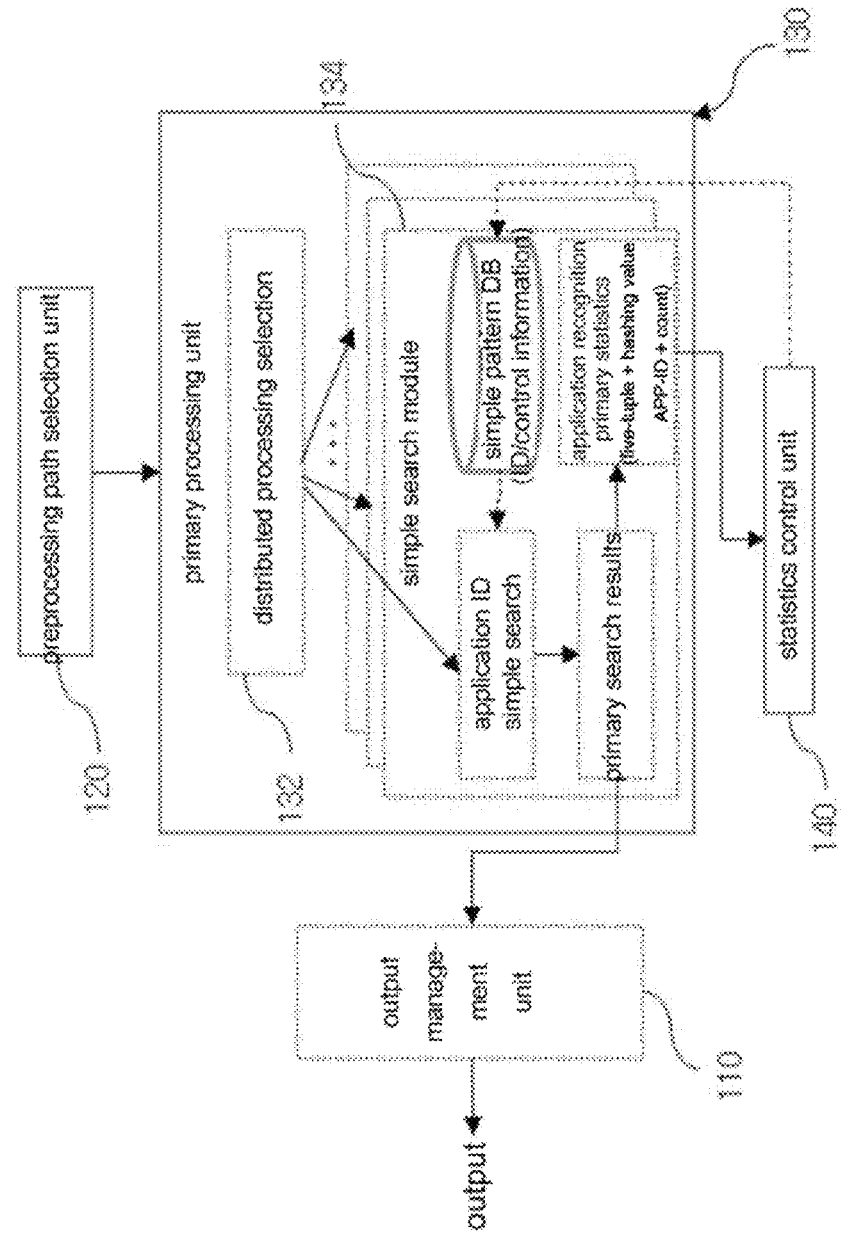
FIG. 4 is a diagram schematically illustrating the configuration of the primary processing unit of the fast application recognition system according to an embodiment of the present invention.

FIG. 4 is a diagram schematically illustrating the configuration of the primary processing unit 130a of the fast application recognition system according to an embodiment of the present invention. Referring to FIG. 4, the primary processing unit 130 may include a distributed processing selection module 132 and an application ID simple search module 134, and may function to search for frequently used simple application patterns in a distributed manner.

The distributed processing selection module 132 may perform a session distribution function so that a packet input from the preprocessing path selection unit 120 may be subjected to session maintenance-based distributed parallel processing on a five-tuple value basis. For example, when the five-tuple hashing values of packets are the same, the packets may be transmitted to the same application ID simple search module 134, so that the same simple pattern database may be used. However, the embodiment is not limited thereto.

The simple search module 134 may extract a pattern from the data information of the input packet, may search for the application ID of the packet corresponding to the simple pattern database, and may transmit defined control information to the output management unit 110 if a search result value is present. Furthermore, the simple search module 134 may transmit the five-tuple value, five-tuple hashing value, application ID and statistics information of a packet obtained through the processing of the processed application recognition primary statistics module statistics control unit 140, thereby generating/updating the sub-session table of the preprocessing path selection unit 120.

If a search result value is not present because the pattern of the input packet has not been found in the simple pattern database, the simple search module 134 may provide the control information "no match" to the output management unit 110. In this case, the output management unit 110 may transmit the corresponding packet from the input primary buffer module 112 to the input secondary buffer module 116, and the input secondary buffer module 116 transmits the corresponding packet to the statistics control unit 140, thereby performing processing in a higher stage.

To minimize search processing delay and increase search hit rate, only application patterns each of which is frequently used a number of times equal to or larger than a threshold value within a set time may be registered in the simple pattern database. For example, a method of performing an update through the update system of the statistics control unit 140 once a day or a method of updating only top 200 application patterns having highest hit rates within 24 hours may be used. When only frequently used application patterns are registered and then searching is performed, it is possible to identify the application IDs of 50 to 70% of the total traffic and the amount of traffic that is processed by a host may be minimized. However, top applications having highest hit rate may vary depending on the specifications of hardware, and furthermore the configuration of an application simple pattern database and an update method may vary depending on the total amount of traffic and processing purposes. Therefore, the present embodiment is not limited thereto.

Figure 5:
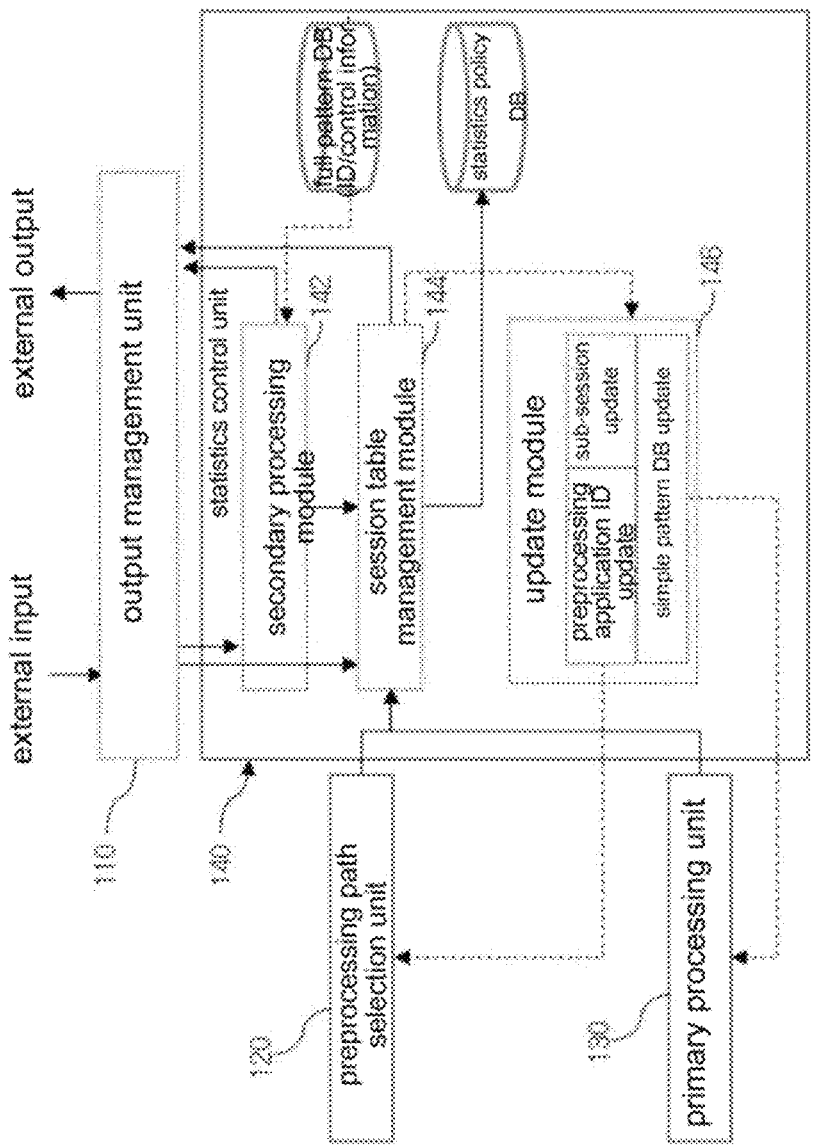
FIG. 5 is a diagram schematically illustrating the configuration of the statistics control unit of the fast application recognition system according to an embodiment of the present invention.

FIG. 5 is a diagram schematically illustrating the configuration of the statistics control unit 140 of the fast application recognition system according to an embodiment of the present invention. Referring to FIG. 5, the statistics control unit 140 may include a secondary processing module 142, a session table management module 144, and an update module 146.

The secondary processing module 142 may perform the control function of receiving a packet whose detailed analysis has been requested by the packet preprocessing path selection unit 120 or primary processing unit 130 or a packet whose application ID has not been defined from the output management unit 110 and extracting the application ID and control information of the corresponding packet through the search of a full pattern database. In this case, the full pattern database may include a table in which application IDs matching the patterns of all packets have been defined, and the configuration of the full pattern database is not limited to a specific one.

The information extracted by the secondary processing module 142 and the statistics information of the packet may be provided to the session table management module 144. The session table management module 144 may function to update five-tuple-based statistics information and control results obtained through the processing of the preprocessing path selection unit 120, and to update a five-tuple-based application ID, statistics information and control results obtained through the processing of the primary processing unit 130 and secondary processing module 142.

The session table management module 144 may function to generate a session table for a new packet input from the output management unit 110, and information about the added session table may be transmitted to the update module 146. Furthermore, the session table management module 144 may perform a control function while referring to application ID-based statistics control policy information stored in a statistics policy database, and may store the statistics information of the controlled packet.

The update module 146 may update the preprocessing application ID table information of the dynamic list processing module 127 of the preprocessing path selection unit 120 in real time through the update of a preprocessed application ID, and may update the sub-session table information of the sub-session processing module 125 of the preprocessing path selection unit 120 in real time through sub-session update. Furthermore, the update module 146 may extract the pattern of frequently used application IDs, and may update the simple pattern database of the application ID simple search module 134. For example, it may be possible to update the simple pattern database with the pattern of an application ID most frequently used per day, but the embodiment is not limited thereto.

In accordance with an embodiment of the present invention, the output management unit 110 may simultaneously transmit a packet to the secondary processing module 142 and the session table management module 144, or may transmit a packet only to the secondary processing module 142. In the former case, the session table management module 144 provides statistics and packet control regardless of the processing delay of the secondary processing module 142, thereby enabling fast processing. In contrast, in the latter case, when the secondary processing module 142 searches for the application ID of a packet and transmits the application ID to the session table management module 144, the application ID information may be added to the statistics information and session information of an existing processed session, thereby increasing the accuracy of statistics and control.

Figure 6:
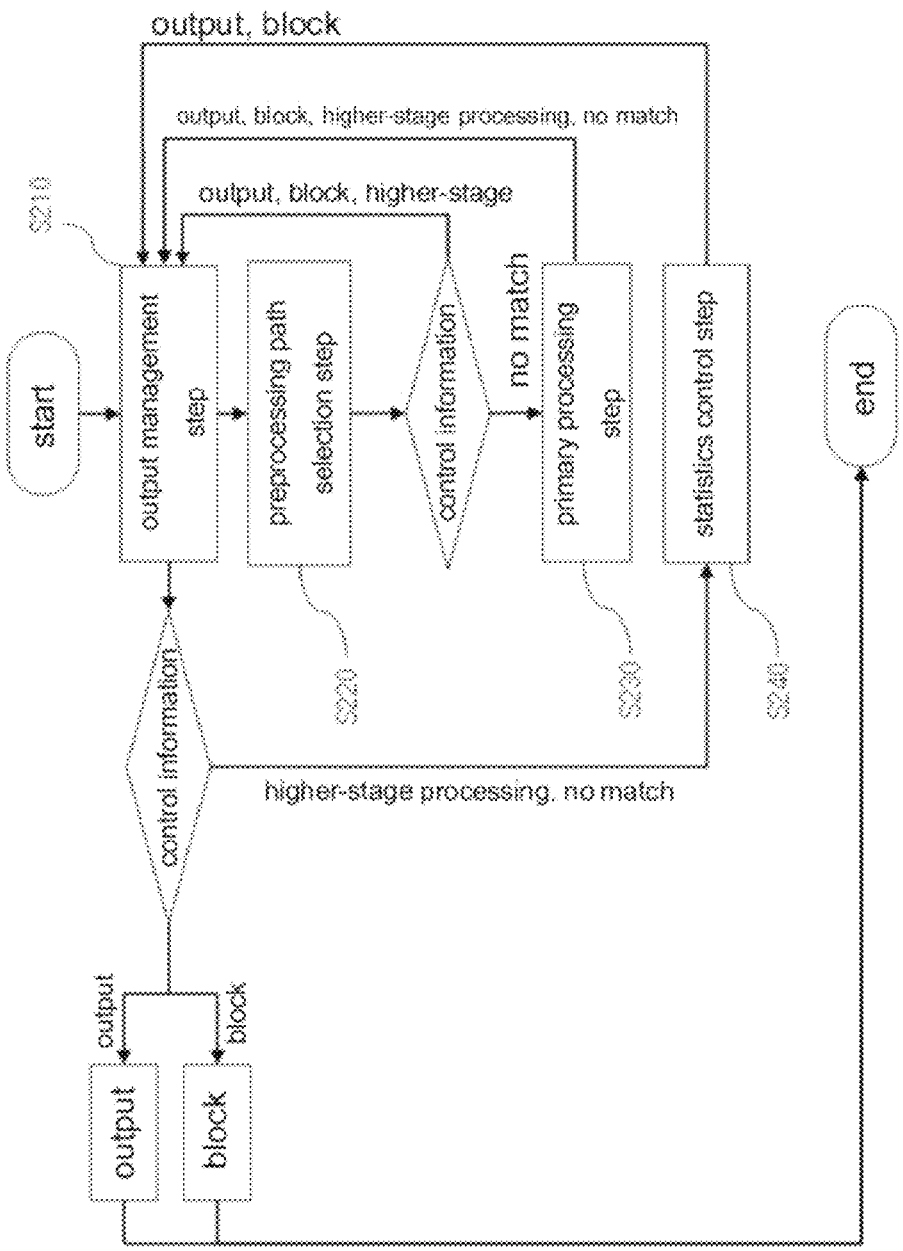
FIG. 6 is a flowchart illustrating a fast application processing method according to an embodiment of the present invention.

FIG. 6 is a flowchart illustrating a fast application processing method according to an embodiment of the present invention. Referring to FIG. 6, the fast application processing method according to this embodiment of the present invention includes output management step S210 of buffering an input packet, and transmitting the packet to the outside in accordance with control information; preprocessing path selection step S220 of extracting control information corresponding to the header information of the packet received from output management step S210, and returning the extracted control information to output management step S210; primary processing step S230 of receiving a packet not processed at preprocessing path selection step S220, extracting control information corresponding to the pattern of the packet using a simple pattern database, and returning the extracted control information to output management step S210; and statistics control step S240 of receiving a packet from output management step S210 in accordance with the control information of preprocessing path selection step S220 and primary processing step S230, extracting control information corresponding to the pattern of the packet using a full pattern database, and returning the extracted control information to output management step S210. In this case, the above steps may perform the respective functions of the output management unit 110, the preprocessing path selection unit 120, the primary processing unit 130, and the statistics control unit 140.

In accordance with an embodiment of the present invention, output management step S210, preprocessing path selection step S220 and primary processing step S230 may be performed by application recognition hardware, and statistics control step S240 may be performed by a host.

The fast application recognition system and the fast application processing method according to the present invention are configured to cache application analysis information in real time and recognize an application only through a search for the header information of a packet, and to conduct a corresponding control policy, thereby achieving the advantage of processing an application at fast speed. Furthermore, a simple search using the header information of a packet and an application ID is performed by hardware separate from a host, thereby achieving the advantage of minimizing the load of the host. Accordingly, the fast application recognition system and the fast application processing method according to the present invention may be applied to 10 gigabyte (GB) or higher massive traffic.

Furthermore, the fast application recognition system and the fast application processing method according to the present invention are configured to inherit application information using a sub-session table and to conduct a corresponding control policy, thereby minimizing the processing load of the host and thus improving application recognition and processing performance.

Although the preferred embodiments of the present invention have been disclosed for illustrative purposes, those skilled in the art will appreciate that various modifications, additions and substitutions are possible without departing from the scope and spirit of the invention as disclosed in the accompanying claims.

What is claimed is:

1. A fast application processing method, comprising:
    an output management step of buffering an input packet, and transmitting the packet to an outside in accordance with control information;
    a preprocessing path selection step of extracting control information corresponding to header information of the packet received from the output management step, and returning the extracted control information;
    a primary processing step of receiving a packet not processed at the preprocessing path selection step, extracting control information corresponding to a pattern of the packet using a primary pattern database, and returning the extracted control information; and
    a statistics control step of receiving a packet from the output management step in accordance with the control information of the preprocessing path selection step and the primary processing step, extracting control information corresponding to a pattern of the packet using a secondary pattern database, and returning the extracted control information.

2. The fast application processing method of claim 1, wherein the output management step, the preprocessing path selection step and the primary processing step are performed by application recognition hardware, and the statistics control step is performed by a host.

* * * * *